Figure 1:
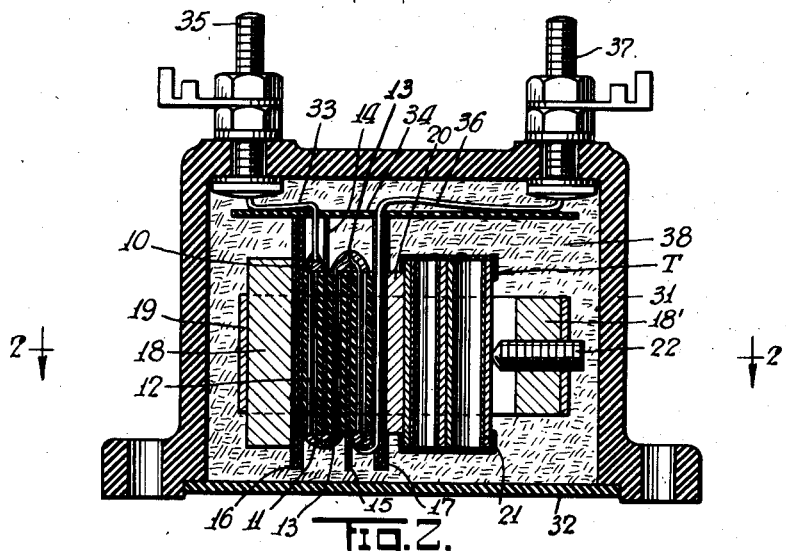

Aug. 28, 1945.   S. HEYMAN   2,383,480
TEMPERATURE COMPENSATED CAPACITORS AND REACTANCES
Filed Oct. 8, 1940   2 Sheets-Sheet 1

INVENTOR
Sam Heyman
BY
Dean Fairbank & Hirsch
ATTORNEYS

Aug. 28, 1945.        S. HEYMAN        2,383,480
TEMPERATURE COMPENSATED CAPACITORS AND REACTANCES
Filed Oct. 8, 1940        2 Sheets-Sheet 2
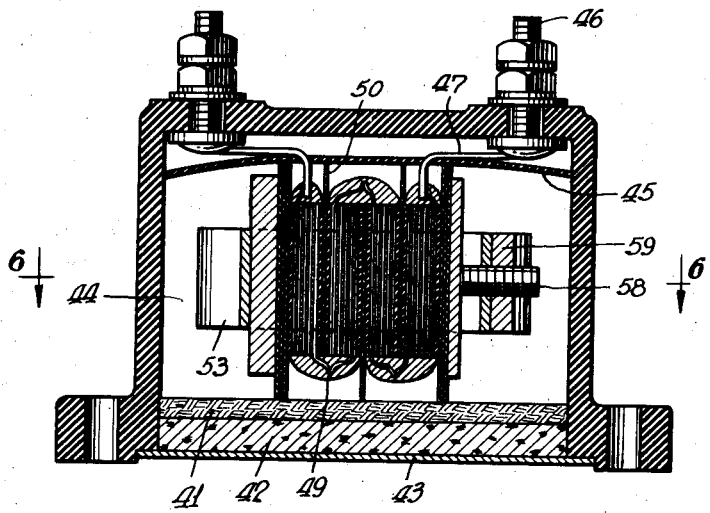
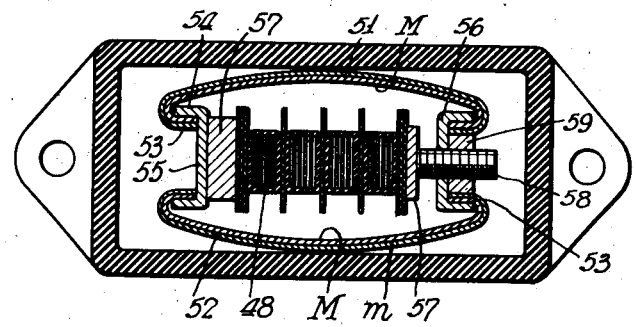
INVENTOR
Sam Heyman
BY
Dean Fairbank & Hirsch
ATTORNEYS Patented Aug. 28, 1945

2,383,480

UNITED STATES PATENT OFFICE 2,383,480

TEMPERATURE COMPENSATED CAPACITOR AND REACTANCE

Sam Heyman, New Bedford, Mass., assignor to Aerovox Corporation, New Bedford, Mass., a corporation of New York Application October 8, 1940, Serial No. 360,265

24 Claims. (Cl. 175—41)

The invention is concerned with temperature compensated capacitors of the fixed type and with circuits in which such capacitors have peculiar utility.

One of a number of important uses for the invention is in goniometer circuits in which the time phase relationship of the currents in the antennae is set to produce definite radio space patterns used in flight by instrument. Since the inductive coils used in such circuits have a positive temperature coefficient and the condenser plates or foils have a positive coefficient of expansion, both factors in the product of inductance and capacitance are subject to variation with temperature change either due to heating in operation or to change in ambient conditions. The resonant frequency and phase angle which depends on said product of inductance and capacitance would vary materially as a consequence, rendering the beacon transmitter inaccurate.

An object of the invention is to provide a reactance circuit, which without resort to auxiliary electrical equipment is automatically and reliably compensated to any desired degree for variations in characteristics that are due to temperature changes.

Another object is to provide a simple capacitative unit which may be adjusted to any desired temperature coefficient, thereby to maintain substantial constancy of capacitance with varying temperature, or to decrease or to increase in effective capacitance at predetermined rate with change in temperature.

Another object is to provide a capacitance of the above type which may be readily and conveniently set to impart to it a desired fixed temperature characteristic and which is not subject to fortuitous variation in the course of use or to disturbance by tampering.

Another object is to provide a unit of the above type, of simple and rugged construction, the capacitative element of which may be of conventional character, requiring no auxiliary compensating condenser units, the danger of excessive corona incurred with such compensating condenser and resultant breakdown thereof being obviated.

The invention involves the association with a capacitative unit of the fixed type and of generally conventional construction, of a temperature compensator, effective to alter the capacitance of the unit to some predetermined degree from the value that it would otherwise have at any given temperature. Desirably the temperature compensator is firmly associated with respect to the capacitative unit and resiliently transmits pressure thereto and has a temperature coefficient such as to vary the pressure and accordingly to effect minute variations in the thickness of the dielectric and therefore of the capacitance under the exerted pressure.

In a preferred specific construction the compensating means has a negative temperature coefficient to effect a decrease in capacitance with rise in temperature. The temperature compensator to this end is desirably made up of bowed bi-metal plates with the high expansion element on the concave side, and the initial pressure upon said compensator is set to the desired correction coefficient which varies in inverse ratio with such pressure.

Figure 2:
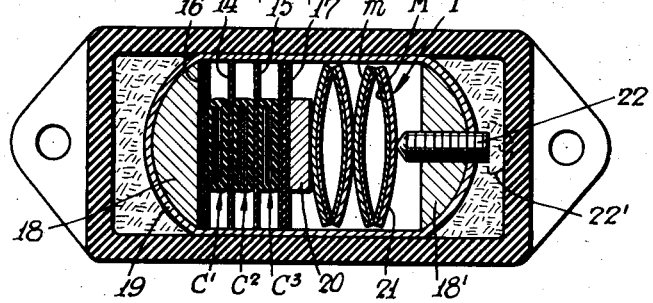
Figure 3:
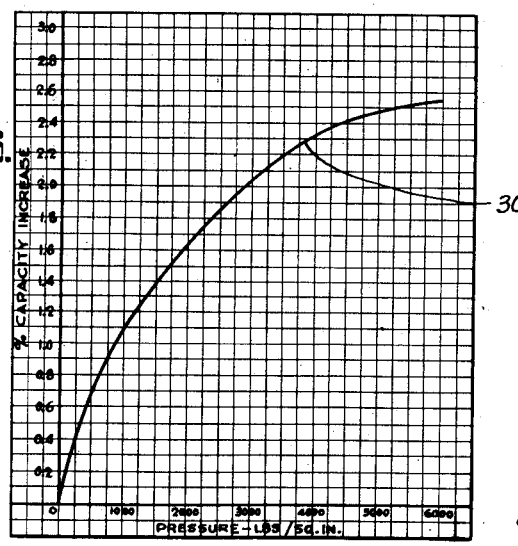
Figure 4:
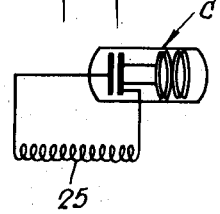

In the accompanying drawings in which are shown one or more of various possible embodiments of the several features of the invention, Fig. 1 is a view in longitudinal cross-section of a condenser structure embodying the invention, Fig. 2 is a transverse sectional view taken on line 2—2 of Fig. 1, Fig. 3 is a graph illustrating the correlation between the percentage of capacity increase and the pressure upon the capacitance, Fig. 4 is a diagrammatic view of a reactance according to the invention, Fig. 5 is a view in longitudinal cross-section of a modified form of the invention, and Fig. 6 is a view in transverse cross-section taken on line 6—6 of Fig. 5.

Referring now to Figs. 1 and 2 of the drawings, the capacitative unit comprises one or more conventional fixed impregnated stack condensers of conventional construction, each of these condensers being made up of the usual two sets of foil sheets to protrude from opposite ends as at 10 and 11 beyond the interleaved dielectric sheets 12, preferably of mica. In the drawings three such condenser stacks C', C², and C³ are illustratively shown, connected as desired, for instance, by soldering the neighboring electrode terminals together as at 13. Preferably sheets of mica or other insulation 14 and 15 respectively are interposed between the consecutive condenser stacks to prevent arcing over, and the condenser unit is sandwiched between two laminated mica plates 16 and 17. Plate 16 is held against the flat face of a segment shaped metal piece 18 at one end of a strong relatively rigid band-shaped metal holder or clamp 19 which encompasses the condenser structure. A temperature compensator T also encompassed by clamp band 19 is held against the capacitative unit and through an interposed pressure plate 20, desirably of metal, exerts pressure against said unit, impressed by a screw 22 which extends through segment shaped metal piece 18' at the end of the clamp bend opposite the condenser stack. Thus, depending upon the setting of the screw 22, more or less normal pressure is transmitted through the temperature compensator by way of pressure plate 20 against the capacitative unit, which in turn, is pressed against the flat end 18 of the clamp band.

The temperature compensator varies with temperature in its effective length along the direction of the pressure transmitted therethrough to the capacitative element. It is of resilient construction or has an associated resilient part, to maintain at all times snug contact with respect to the capacitative element at one end thereof, and the screw 22 at the other end.

Desirably, the temperature compensator is of one or more, illustratively four, bowed bi-metal plates 21 disposed in lens shaped pairs. Desirably the plates are of a combination of "Invar" and nickel steel, but of course other metal couples may be used that afford sufficient differential coefficient of expansion for the desired purpose. For use on the particular circuit described below and on many other circuits, a negative temperature cofficient is required. To this end the high expansion metal M is on the concave side and the low expansion metal m is on the convex side of the respective plates.

In many alternating current circuits it is important that the resonant frequency be maintained constant with temperature change. In Fig. 4 is shown diagrammatically an inductive reactance made up of an inductance coil 25 and capacitance reactance made up of a capacitance C in parallel therewith, of the temperature compensated type above described. In the absence of temperature compensation it is seen that as the inductance coil becomes heated, its positive temperature coefficient leads to a change in the self inductance. Likewise with increase in temperature, the change in effective area of the foils or plates of the condenser results in a change in capacitance. Thus, both the inductance and the capacitance change concurrently and the product of inductance and capacity changes materially with temperature, which is objectionable in many circuits of which the goniometer circuit above referred to is an example.

By the present invention the condenser may be given a compensating factor predetermined to compensate substantially precisely for the undesired temperature variations of eelctrical characteristics, or in some relations, to compensate incompletely or in other relations to over-compensate to any predetermined degree. The degree of compensation is determined by the setting of the screw 22 and the law of operation thereof is made clear from the graph 30 appearing in Fig. 3, in which it appears that the percentage of capacity increase of the condenser becomes progressively less with increased initial or normal pressure upon the temperature compensator. Therefore, depending upon the setting of the screw 22, a given change in pressure may bring about a relatively large change in capacitance if the normal pressure setting is low and a relatively small change in capacitance if the normal pressure setting is high.

Depending on the initial pressure, determined by the setting of the screw 22, the disturbing effect in electrical characteristic due to temperature variations of the condenser may be completely compensated for by setting the screw in the median range of the graph. Over-compensation may be effected by a setting at the low part of the graph, and that relation would be availed of, for instance, where, as in Fig. 4, the temperature compensator corrects not only for the temperature variation in the condenser but also for that of the inductance. Partial compensation, that is, for predetermined low positive temperature coefficient condenser, may be attained by setting the screw 22 for operation at a high part of the graph. An enhanced positive temperature coefficient may be attained by reversing the position of the expansion plates in the temperature compensator, that is, by placing the high expansion metal on the convex side and the low expansion metal on the concave side of the respective plates.

While the condenser may be constructed to permit manual adjustment of its compensation factor to suit different requirements, it will be understood that for many installations, as for instance for the goniometer circuit, the unit would be used with a fixed setting. For such purpose, the screw 22 would be locked in set position or made substantially tamper-proof, as for instance, by cutting off the fillister head 22' (shown in dotted lines) after the screw has been set. To calibrate the condenser, the adjusting screw 22 would be turned while measuring the temperature coefficient of capacity by a suitable instrument, such as for instance, a frequency Drift meter, until the desired temperature coefficient has been reached. To eliminate fortuitous variations of capacity, it is desirable to heat-treat the assembly prior to calibration, so as to stabilize the individual parts and remove strains.

A desirable enclosure for the unit is a molded casing 31 with its bottom closed by an insulating sheet 32 secured therein. The terminal lead 33 from the condenser extends to the binding post 35 by passing through a corresponding aperture in an insulating plate 34 desirably of mica which rests upon the upper edge of plates 16 and 17. The companion terminal lead 36 extends through an aperture in the inner leaf or laminated plate 17 and is directed upward between the laminations of said plate through a corresponding aperture in the horizontal plate 34 to binding post 37.

If a soft wax is employed completely to embed the condenser assembly within the casing and to fill all voids, it will not interfere with the flexure of the bi-metal plates under change of temperature. It is, however, preferred, as shown in Fig. 1, to employ the usual pitch or filling composition and to exclude the same from the space between the bowed plates, and this may be readily accomplished by sealing the ends of such spaces as for instance by "Scotch" tape as shown at T.

In the embodiment of Figs. 5 and 6 is shown an alternative arrangement in which the bi-metal plates of the temperature compensator T are left free to flex with change in temperature. Desirably, the casing has a cork gasket closure 41 upon which is poured a layer of sealing compound 42 and which is in turn covered by the bottom plate 43. Thus, moisture is effectively excluded from the hermetically sealed cavity 44 in the casing, which is devoid of filling material. A mica insulator 45 is desirably interposed between the top of the casing and its binding posts 46, to prevent arcing over through the intervening void, the leads 47 extending through small apertures (not shown) in said insulator.

The alternative embodiment of heat compensated unit shown in Figs. 5 and 6 is made up of the conventional individual condenser units 48 connected in series as at 49 with interposed mica plates 50 substantially as in the other embodiment. In this embodiment, the sides 51 and 52 of the metal structure encompassing the capacitative unit constitute the temperature responsive means, desirably in the form of bi-metal plates. These plates 51 and 52 which flank the capacitative unit, are inturned as at 53 at their ends to hook over the sides 54 of U-shaped end clamps 55 and 56, the bases of which end clamps are seated upon spacer plates 57 between which the capacitative element is lodged. Through the end clamp 56 extends the screw 58, said clamp being thickened desirably by superposing one or more metal plates 59 over the base thereof, lodged between the hooked over ends 53 of the bi-metal strips.

The high expansion metal would ordinarily be at M on the concave side of the two bi-metal plates and the low expansion metal $m$ at the convex side. The setting and calibration to the desired temperature coefficient of capacitance would be effected exactly as in the embodiments of Figs. 1 and 2 by the initial setting of the screw 58. With increase in temperature the bi-metal plates would tend to straighten out and thereby reduce the pressure transmitted through the end clamps 56 and 57 and conversely upon decrease in temperature. The bi-metal plates are symmetrical at all temperatures, so that at all times the pressure exerted thereby is longitudinally of the capacitative unit without twisting or shearing strain thereon. As in the embodiment of Figs. 1 and 2, the bi-metal plates might be reversed, that is, with the high expansion metal at the convex side and the low expansion at the concave to attain a condenser of high positive temperature coefficient.

It will be understood that the heat compensated capacitative unit shown in Figs. 1 and 2 could be used in the casing structure shown in Figs. 5 and 6, and conversely.

As many changes could be made in the above construction and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent is:

1. A temperature compensated electrostatic condenser comprising a capacitative element of the fixed type, a resilient temperature responsive compensator associated therewith and constantly in pressure transmitting relation with respect thereto, said compensator being arranged symmetrically with respect to the axis of the capacitative element and transmitting pressure axially of said condenser, automatically varied with expansion and contraction of said compensator under change of temperature thereof.

2. A temperature compensated electrostatic condenser comprising a capacitative unit of the fixed type, a metallic structure encompassing said capacitative unit, said structure including pressure plates engaging opposite faces of the capacitative unit, said structure including bowed bi-metal plates correlated with said pressure plates, automatically to vary the compression of said capacitative element with the expansion and contraction of said bi-metal plates.

3. A temperature compensated electrostatic condenser comprising a capacitative element of the fixed type, a resilient temperature responsive compensator associated therewith, and a rigid holder embracing said associated elements, whereby pressure is maintained upon said capacitative element and is automatically varied with the expansion and contraction of said compensator under change of temperature thereof.

4. A temperature compensated electrostatic condenser comprising a capacitative element of the fixed type, a resilient temperature responsive compensator associated therewith having a correction coefficient depending on the initial compression thereof, a substantially rigid holder retaining said capacitative element and said compensator, and means coacting with said compensator for impressing a predetermined normal compression upon and therefore determining a fixed correction coefficient of said compensator.

5. A temperature compensated electrostatic condenser comprising a capacitative element of the fixed type, an associated resilient temperature responsive compensator, a relatively rigid holder retaining said capacitative element and the compensator in associated relation, and including a screw through said holder pressing against said compensator, and a pressure plate interposed between said compensator and said capacitative element.

6. A temperature compensated electrostatic condenser, including a capacitative unit of the fixed type, comprising a stack of electrodes with interposed dielectric sheets, retainer means for said capacitative unit and one or more bi-metal bowed plates interposed between said retainer and said condenser stack to exert pressure upon the latter varying with temperature.

7. A temperature compensated electrostatic condenser, including a capacitative unit of the fixed type, comprising a stack of electrodes with interposed dielectric sheets, retainer means for said capacitative unit and for one or more bi-metal bowed plates having the high expansion element on the concave side, to vary the pressure upon the condenser stack in a relation inversely with the change in temperature.

8. A temperature compensated electrostatic condenser comprising a capacitative stack, including metal electrodes and interspaced dielectric, retainer means for said unit, a resilient bi-metal temperature responsive structure interposed between the retainer and the stack, and having a temperature coefficient depending upon the pressure thereon, means transmitting pressure through said bi-metal structure to said stack, and means for adjusting the pressure to the desired temperature coefficient.

9. A temperature compensated electrostatic condenser comprising a capacitative unit of the fixed type, including a stack of electrodes with interleaved dielectric plates, a clamp about said capacitative unit, bowed bi-metal plates interposed between the stack and the clamp, and a screw through the clamp exerting pressure upon the bi-metal plates transmitted therethrough to the stack.

10. A temperature compensated electrostatic condenser comprising a capacitative stack, including electrodes and interposed dielectric sheets, a retainer for said unit, a temperature compensator interposed between said retainer and said stack, said compensator comprising one or more bowed bi-metal plates with the high expansion metal at the concave side thereof, said compensator being characterized by a negative temperature coefficient varying inversely with the concavity of the respective plates, a screw through the retainer transmitting pressure through the compensator to the capacitance and adjustable to determine the concavity of the bi-metal plates and therefore the coefficient of temperature compensation.

11. A temperature compensated electrostatic condenser comprising a capacitative stack, including electrodes and interposed dielectric sheets, a metal clamp with an over-all height considerably larger than the thickness of the stack, a screw through the end of the clamp, and a series of bowed bi-metal plates interposed between said screw and said stack and transmitting pressure to the latter.

12. In an article of the character described, a relatively rigid clamping band, a capacitative stack comprising electrodes and interleaved dielectric sheets, a series of bi-metal bowed plates, all encompassed by said metal band, and a screw through one end of said band pushing the stack and the bowed plates together within the clamping band, and determining a predetermined pressure upon said stack.

13. The combination recited in claim 12 in which the adjusted screw is mutilated to preclude tampering therewith.

14. A condenser unit comprising a casing having binding posts, a temperature compensated condenser assemblage in said casing, said assemblage comprising a capacitative unit of the fixed type, a metal element encompassing said unit, including pressure plates engaging the opposite faces of said unit and bi-metallic elements correlated with said pressure plates to vary the presusre exerted upon the interposed unit with change in temperature, means embedding the clamped condenser assemblage within the casing, and means enclosing the space between said bi-metal elements to exclude the embedding composition therefrom.

15. A condenser unit comprising a casing having binding posts, a temperature compensated condenser assemblage in said casing, said assemblage comprising a capacitative unit of the fixed type, a metal element encompassing said unit, including pressure plates engaging the opposite faces of said unit and bi-metallic elements correlated with said pressure plates to vary the pressure exerted upon the interposed unit with change in temperature, a cork gasket closing said casing, sealing compound over said cork gasket for hermetic seal, the interior of said casing being substantially devoid of filling composition.

16. A condenser unit comprising a casing having binding posts, a temperature compensated condenser assemblage in said casing, said assemblage comprising a capacitative unit of the fixed type, a series of bi-metal bowed plates aligned with said unit, a clamping band about said aligned elements, a screw through one end of said clamping band retaining the stack and the bi-metal plates under pressure within said clamp, terminal leads from the capacitative unit to said binding posts, and means embedding the clamped condenser assembly within the casing and rendering the screw inaccessible from the exterior thereof.

17. A temperature compensated condenser comprising a capacitative unit, a temperature compensating unit including one or more bowed bi-metal plates, a pressure transmitting plate interposed between the capacitative and temperature compensating units, means against which said bi-metallic plates react, and means transmitting pressure from the latter to the former which varies with the expansion or contraction of the temperature compensating unit in the direction of transmitted pressure.

18. A temperature compensated condenser comprising a rigid metal clamping band, a number of individual fixed capacitative stacks in superposed relation, insulating plates intervening between successive stacks, a temperature compensating unit comprising a series of bi-metal bowed plates between the sides of the clamp band, a pressure plate interposed between said capacitative stacks and said bowed plates, and a screw through one end of said clamping band contacting the temperature compensating unit for adjusting the initial pressure exerted upon the capacitance.

19. A temperature compensated condenser comprising a casing having binding posts, a fixed condenser assemblage therein, said assemblage comprising a clamping band, one or more fixed condensers extending transversely thereof, associated laminated insulating plates flanking said condensers, a screw through the end of said band, a bi-metal temperature compensating assemblage embraced by said clamping band and interposed between said screw and said condensers for transmitting pressure to the latter, a terminal lead from the upper end of an end condenser, a second terminal lead from the lower end of the other extremity of the other end condenser, said lead extending between laminations of the associated interspacer, said leads being connected to the respective binding posts.

20. A temperature compensated electrostatic condenser comprising a capacitative unit, a resilient temperature compensator associated therewith, and comprising a pair of similar temperature responsive elements at opposite sides of said capacitative unit, and means connecting the ends of said temperature responsive elements and including plates exerting upon the capacitative unit pressure due to said compensator.

21. A temperature compensated electrostatic condenser comprising a capacitative unit, a resilient temperature compensator associated therewith, and comprising a pair of similar temperature responsive elements at opposite sides of said capacitative unit, and means connecting the ends of said temperature responsive elements and including plates transmitting pressure from said temperature responsive elements to the capacitative unit, and a screw through one of said connecting means for regulating the distance between the pressure plates to determine the initial pressure setting.

22. A temperature compensated electrostatic condenser comprising a capacitative element of the fixed type, pressure plates at opposite ends thereof, a pair of bi-metallic plates flanking said capacitative element and affixed at the respective ends thereof with respect to said plates.

23. A temperature compensated electrostatic condenser comprising a capacitative unit of the fixed type, U-shaped end clamp pieces thereagainst, and bi-metallic plates flanking said capacitative unit with its ends hooked about the flanges of said clamps.

24. A temperature compensated electrostatic condenser comprising a capacitative element of the fixed type, U-shaped end clamp pieces thereagainst and bi-metal plates flanking said capacitative unit with its ends hooked about the flanges of said clamps, and an adjustment screw through one of said clamps for adjusting the initial pressure upon the stack.

SAM HEYMAN.